United States Patent [19]

Berglund

[11] Patent Number: 4,848,070
[45] Date of Patent: Jul. 18, 1989

[54] GRASS CATCHING APPARATUS FOR MOWER

[76] Inventor: Andrew L. Berglund, 819 W. Second St., Northfield, Minn. 55057

[21] Appl. No.: 72,878

[22] Filed: Jul. 14, 1987

[51] Int. Cl.$^4$ ............................................. A01D 34/70
[52] U.S. Cl. ........................................ 56/202; 56/16.6
[58] Field of Search ................ 56/16.6, 202; 141/391, 141/314, 114, 68, 290

[56] References Cited

U.S. PATENT DOCUMENTS

| | | | |
|---|---|---|---|
| 3,006,128 | 10/1961 | Weiland | 56/194 |
| 3,065,588 | 11/1962 | Shaw | 56/25.4 |
| 3,199,277 | 8/1965 | Moody | 56/25.4 |
| 3,708,968 | 1/1973 | Enters et al. | 56/16.5 |
| 3,925,968 | 12/1975 | Wagenhals | 56/13.3 |
| 3,971,198 | 7/1976 | Lane | 56/202 |
| 4,095,398 | 6/1978 | Aumann et al. | 56/202 |
| 4,158,280 | 6/1979 | Thomas et al. | 56/16.6 |
| 4,186,546 | 2/1980 | Machado et al. | 56/202 |
| 4,214,424 | 7/1980 | Gobin | 56/202 |
| 4,233,806 | 11/1980 | Richardson | 56/202 |
| 4,310,998 | 1/1982 | Cuba | 56/202 |
| 4,345,418 | 8/1982 | Grizpe | 56/202 |
| 4,377,063 | 3/1983 | Leaphart | 56/202 |
| 4,566,257 | 1/1986 | Akrabawi | 56/202 |
| 4,631,909 | 12/1986 | McLane | 56/202 |

FOREIGN PATENT DOCUMENTS 2081564 2/1982 United Kingdom .................. 56/202

*Primary Examiner*—John Weiss
*Attorney, Agent, or Firm*—Michael, Best & Friedrich

[57] ABSTRACT

A grass catching attachment for use on a rear bagger mower has a rearwardly facing grass discharge chute and a bag support for holding disposable plastic garbage bag in position to receive air and grass clippings from the discharge chute. The bag is mounted adjacent a base housing that includes a discharge opening for the grass at its lower portions, and an air outlet at the upper portions which joins to a conduit that directs the return air forwardly of the mower. Thus, any debris, short grass clippings, pollen, dust or the like that might be carried with the air discharging from the bag is firm from the user in front of the mower and recycled through the grass catcher. The bag is held in a basket that permits easy installation and removal, and substantially increases the amount of grass which can be packed into the bag.

18 Claims, 2 Drawing Sheets

U.S. Patent Jul. 18, 1989 Sheet 1 of 2 4,848,070
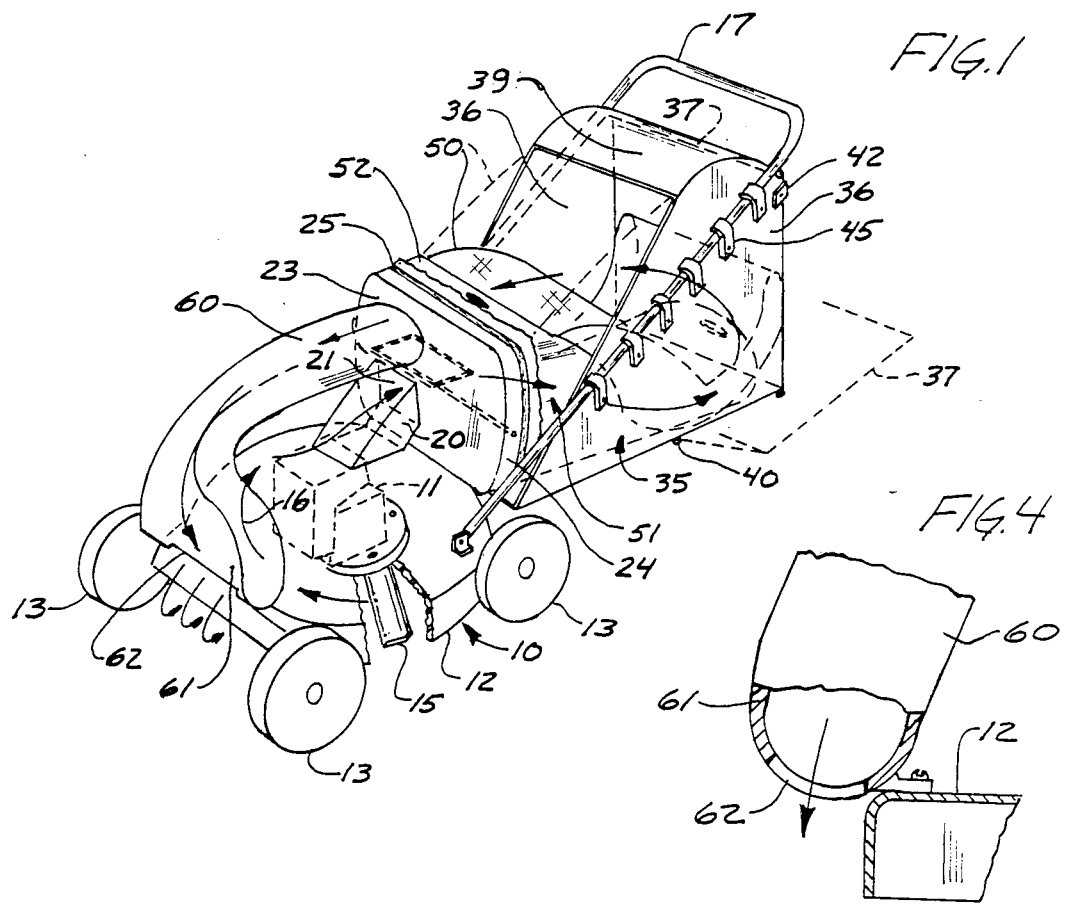
FIG.1
FIG.4
FIG.2
FIG.3
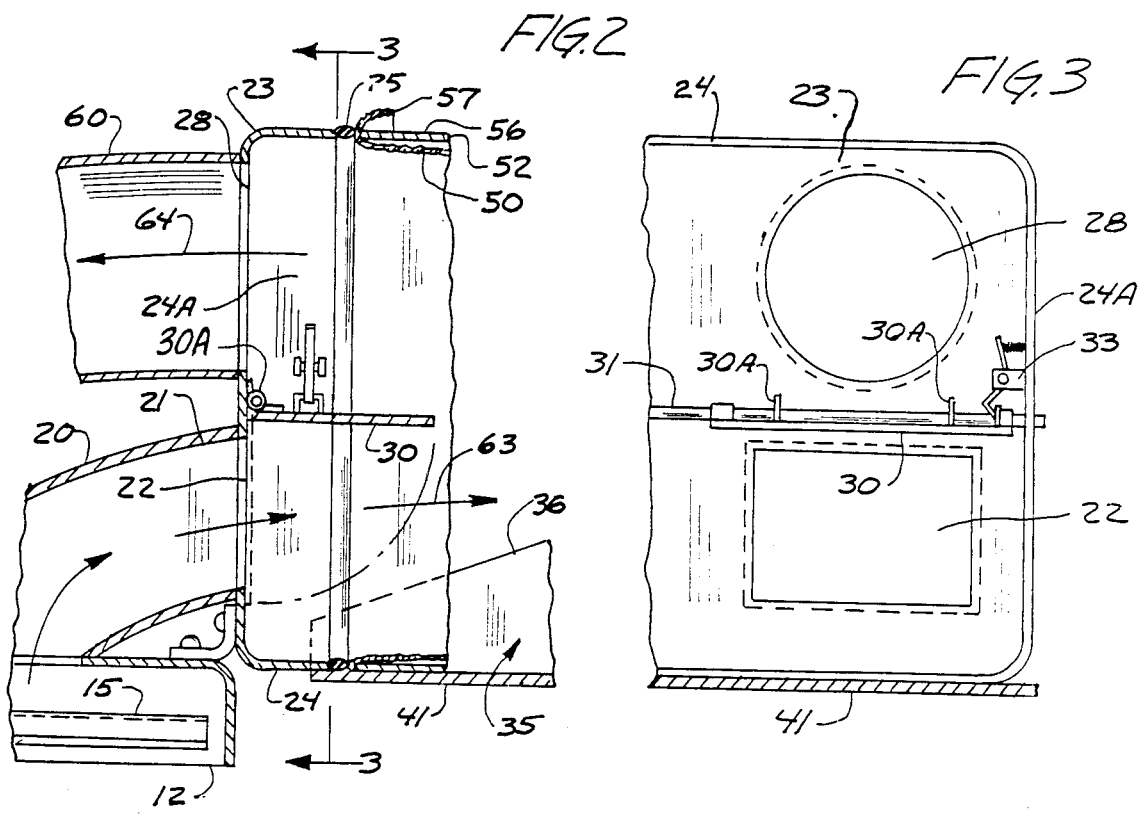

GRASS CATCHING APPARATUS FOR MOWER

BACKGROUND OF THE INVENTION

1. Field of the Invention

The present invention relates to a bagger for a mower, and more particularly a bagger which receives a flow of cut grass and air and after separation of the grass from the air recirculates the air from the bag to discharge the return air ahead of the mower.

2. Description of the Prior Art

In the prior art, various devices have been advanced that show rear baggers or grass catchers for mowers. U.S. Pat. No. 4,566,257 discloses a plastic bag insert for a lawnmower catcher that has a plate with an inlet opening and a vent opening to allow air to vent in the opposite direction from the inlet, and thus out of the bag. The material is merely discharged at a location other than under the mower or ahead of the mower. Several different configurations of the patent are shown with the parts held together with Velcro hook and loop fasteners in certain instances.

A grass collection cart is illustrated in U.S. Pat. No. 4,310,990, and has a flexible bag that receives grass clippings, and an air outlet, which also discharges through the rear of the bag. This is used for lawn tractors where the operator rides on the tractor, and illustrates a common form of bagger.

A disposable lawn bag, such as a plastic bag is shown in U.S. Pat. No. 4,233,806, and there are supports for mounting the bag onto a power lawnmower. The support hangs on the handle of the mower, and a return filter or permeable bag is used as a secondary bag that will fill with debris after the main bag and forms an air outlet for returning the air that carries the grass into the bag to the atmosphere. Leaving the return filter bag off would let the air discharge forwardly from the main bag but this unit does not return the air flow to the front of the mower.

A disposable grass catcher is shown in U.S. Pat. No. 4,186,546, which uses a bag that has perforations in it so that the air will vent out of the bag as the bag fills with grass clippings. U.S. Pat. No. 4,059,398 shows a bagger attachment for a riding mower with an internal screen and an air duct that provides a return of air.

A combined lawnmower, lawn vacuum and debris collector is shown in U.S. Pat. No. 3,708,968. This device has a return circuit for the air that discharges the air back into the mower housing, in the center of the mower, through a return chute. The return chute has a booster fan for propelling materials in the return circuit.

U.S. Pat. No. 4,631,909 shows a mower that has a closed loop flow path where grass clippings are impelled into a fully enclosed, one piece grass catcher (in this case, it is a rigid grass catcher) and the air from the grass catcher is returned to an opening at the forward side of the catcher that lets the air discharge through the housing of the mower at the front. This device discharges into the mower housing but in a location where the material, if there is any substantial debris, is in the center portions of the blade which are not traveling very fast, and under conditions where the material is likely to play because of restrictions in the flow. An additional opening is required in the mower housing, and plugging or clogging can quite easily take place.

Other U.S. Patents which illustrate typical baggers include:

U.S. Pat. No. 3,006,128;
U.S. Pat. No. 3,065,588;
U.S. Pat. No. 3,199,277;
U.S. Pat. No. 3,925,968; and
U.S. Pat. No. 3,971,198.

The patents in the list above show the general state of the art in debris collection for lawnmowers.

SUMMARY OF THE INVENTION

The present invention relates to a bagger for a mower which utilizes existing airflow of a rotary blade lawnmower and directs the material into a standard disposable bag, such as a plastic garbage bag supported relative to the handle of the mower. The open end of the disposable bag is coupled to a support housing that has an inlet opening for the flow of grass clippings and air and a discharge opening for return air. The grass clippings will be dropped into the bag and the return air is directed forwardly through a duct or chute that directs the material ahead of the mower cutting blade. The air flow velocity drop in the disposable bag causes the solid particles to drop out of the airflow and stay in the bag, except for very light debris and the like, which is then recycled through the mower.

A bag support as shown includes a sleeve having an open end around which the edge of the bag defining the bag opening is placed so the bag is held open, and then the support is moved into an outer basket, where the sleeve and edge of the open mouth of the bag are urged against a seal on an upright base housing having the openings that lead from the mower to the bag and which permit air to discharge from the bag.

The outer basket for supporting the disposable bag is secured to the lawnmower handle by releasable hooks or clips, and has a rear door that can be dropped down once the disposable bag is filled with debris so that the disposable bag and its sleeve support can be removed rearwardly. The disposable bag then can be closed with a wire tie, removed from the sleeve support and a new bag put into place. The disposable bag, which is envisioned to be one of the common disposable plastic garbage bags, will balloon up with air flow so it fills the support basket and thus the air pressure itself tends to keep the disposable bag and the bag sleeve support sealed against the gasket on the base housing.

The base housing is a plate having an edge rim and can be made of either metal or plastic, and which is fixed to the mower. A baffle or door is used with the port or opening that carries grass clippings from the mower, that is, the baffle is associated with the outlet from the mower which is also the inlet to the disposable bag. The baffle is preferably spring loaded closed and is held open with a spring clip when the bag is to be filled. Closing the baffle prevents the clippings from being propelled rearwardly when the bag is removed.

The air enters the bag and then circulates as it hits the rear walls of the bag. The clippings tend to drop out of the air flow as the air changes direction. The air is then directed forwardly out a port or opening in the upright base housing and through a discharge chute that is held by the base housing. The discharge chute deposits the material ahead of the mower housing. The operator then does not have to breathe dust and pollen laden air from the mower discharge. The airborne particles that did not stay in the bag but are carried through the discharge chute are run over by the mower and may be recirculated through the grass catcher bag or left on the ground.

The rear disposable bag thus is not perforated, and it avoids the problems that are attendent with using a mesh or perforated grass catching bag where the openings in the mesh tend to plug up with grass clippings so that the ability to exhaust the incoming air becomes less efficient over time as dust and dirt clog the air passageways through the mesh bag. As long as the air is able to get around the baffle that is provided on the base housing, the air exhaust efficiency is optimal.

It should be noted that the high velocity of the mower discharge air coming from the mower helps to pack the grass clippings tightly into the disposable bag, and that no other form of packing the grass clippings is required. The bottom of the disposable bag is packed first with the present arrangement, for greater efficiency.

Further, the outer basket that is used with the present invention is supported by clips so that it can be removed if bagging is not desired. An optional side discharge chute can be utilized by closing the provided baffle and opening the side discharge chute provided on most rear bagger mowers discharge material downwardly.

The bag support sleeve that is shown is made of a plastic that is resilient, and it has a rearwardly extending support tongue that engages the rear of the outer basket to create a forward force tending to urge the sleeve against the seal when the disposable bag is pt into place. When the rear door of the outer basket is opened after the disposable bag is full, the tongue has a hand hole for grasping it and acts like a sling to make removal of the disposable bag very simple without excessive spillage.

If desired, the disposable bag can be placed into an outer basket using a mating frame that engages and bears against the base housing without the sleeve support. When the disposable bag unfolds it creates a force on the mating frame used for supporting the bag sufficient to seal to the base housing adequately to prevent excessive escape of debris and grass clippings.

BRIEF DESCRIPTION OF THE DRAWINGS

FIG. 1 is a perspective view of a grass catcher arrangement made according to the present invention and shown on a rotary mower;

FIG. 2 is a vertical sectional view taken through an upright base housing used with a device of the present invention;

FIG. 3 is a fragmentary sectional view of a bagger housing taken along line 3—3 in FIG. 2;

FIG. 4 is a fragmentary sectional view of the forward discharge plenum chamber made according to the present invention;

DETAILED DESCRIPTION OF THE PREFERRED EMBODIMENTS

Figure 5:
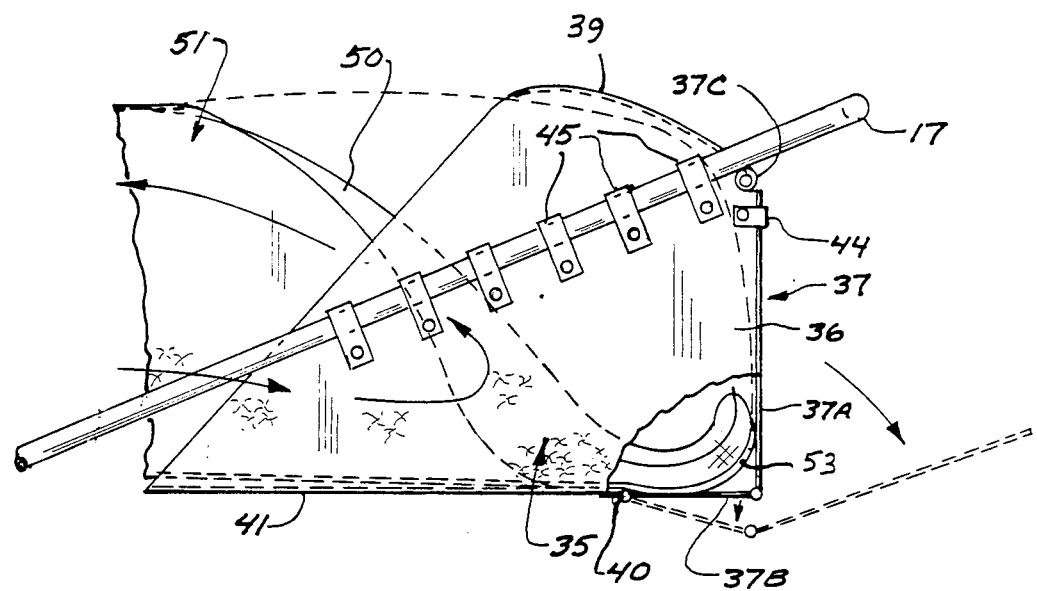
FIG. 5 is a side view of a support basket for supporting a disposable bag used with the present invention.
Figure 6:
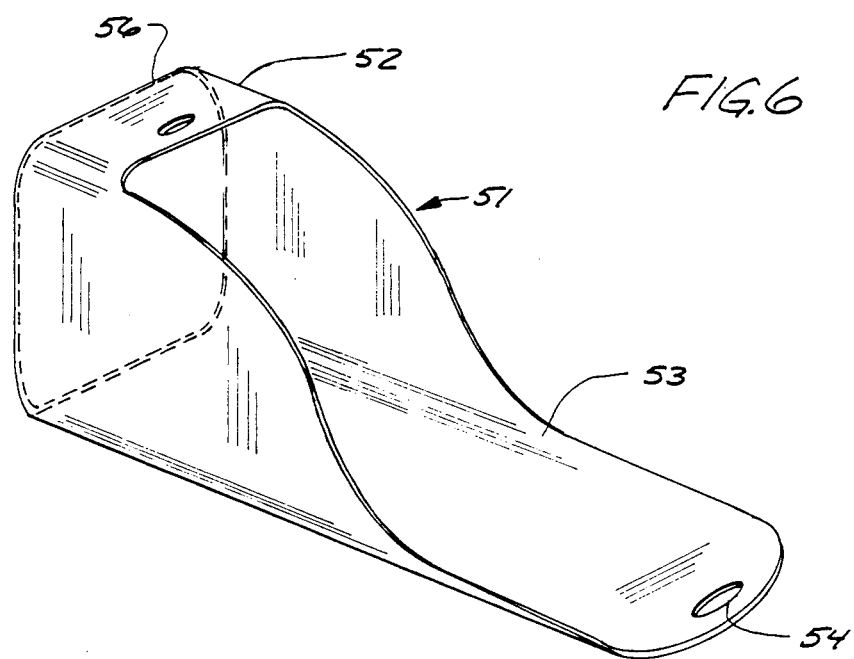
FIG. 6 is a perspective view of a support sleeve for a disposable bag as with the present invention.

Referring to the drawings, a rotary power mower indicated generally at 10 has an engine 11 (shown in dotted lines to reveal other portions of the device in the invention), a mower housing 12, and suitable support wheels 13 that support the mower for movement over the ground. The engine 11 drives a rotary mower blade 15 in a conventional manner, generally in the direction indicated by the arrows 16.

The mower shown is a standard mower having a generally U-shaped handle 17 which is supported onto the mower housing 12 in a desired manner and extends rearwardly and upwardly therefrom. Additionally, the mower has a standard rear discharge chute 20 formed in the housing, which in the form shown merges into a rearwardly facing outlet end 21. The outlet end 21 terminates at a port or opening 22 (FIG. 2) formed in an upright base housing or plate 23 that is suitably fixed to the rear side of the mower housing 12, for example, with suitable brackets. The base housing 23 has an outer peripheral frame member 24 that can be made of metal or formed of plastic. Frame member 24 has a rearwardly facing edge that supports a peripheral seal or gasket 25 that faces toward the handle 17. The seal circumscribes or surrounds the base housing to form a peripheral enclosing seal.

Additionally, as will be explained in greater detail, the base housing 23 has an outlet port or opening 28 therein above port 22 and both ports are surrounded by the frame 24 and seal 25. The base housing 23 extends across the rear of the mower housing between the side members of handle 7. The frame 24 has smoothly rounded corners.

The port or opening 22 forms an outlet port for air and grass clippings that come through the discharge chutes 20. The outlet port or opening 22 is selectively closed or opened with a spring loaded baffle door 30 that is hingedly connected to the frame 23 with a suitable hinge 31 the hinge may be a pivot pin that spans across the base housing and is mounted in the upright legs 24A of the frame member 24. A torsion spring 30A is used to spring load the baffle door 30 toward its closed position. One or both of the upright legs 24A of the frame 24 has a spring clip latch 33 thereon which will be movable to hold the baffle door 30 in an open position as shown in FIGS. 2 and 3, or will permit the baffle door 30 to be closed by the spring load of springs 30A, to close off the opening 22. The latch 33 will yield outwardly to permit the baffle door 30 to be operated can be adjusted up and down along the legs 24A to adjust the position of the baffle door 30 as desired.

A relatively rigid outer support basket 35 is formed with tapered upright side walls 36 and a lower wall 41. The support basket has a rear door assembly 37 that provides an upright rear wall portion 37A and a short horizontal bottom wall portion 37B which can be hinged together about a lateral axis. The forward part of the outer support basket has an open top for ease of installing a disposable bag, but the rear portion of the support basket has a top wall section 39 that provides support and an enclosure for a disposable bag as the bag fills with air.

The support basket 35 is removably supported on the handle 17. As shown, door 37 is hinged with a suitable hinge 40 to the lower wall 41 of the support basket 35. The door 37 extends across the end of the support basket to be opened or closed. The door 37 can be latched in place in any suitable manner as with a spring latch 44 to the handle 17 in its closed position. A handle can be used for lifting and lowering the door 37, the spring latch 44 are on the opposite side walls 36 of the support basket 35. A cross member 37C is provided at the top edge of the door 37 for helping make the assembly rigid.

The support basket 35 is held on handle 17 using clips or hooks 45 that are supported on the side members of handle 17. The outer support basket 35 can be held in place in any desired manner using suitable fasteners so the support basket can be removed if desired when the bagger attachment is not used.

In order to collect the grass, the support basket 35 is made to support a disposable bag, comprising a plastic garbage bag indicated generally at 50, which is of conventional type. The disposable bag 50 is supported in a support sleeve or sling, so that the edge of the open mouth of the bag will mate with the frame 24 and seal against the gasket 25 adequately to prevent substantial air leakage. While many types of frames for holding the disposable bag in position are usable, including a simple peripheral frame that matches the frame 24, in the form shown a disposable bag support and removal sling 51 is used, and includes a relatively short plastic sleeve 52 of size and shape to mate with the peripheral seal 25 and selected in size to receive the disposable bag 50 that is to be used. A tongue or sling member 53 is integral with the sleeve and extends rearwardly from the sleeve 52. The tongue 53 has a handhold opening shown at 54 at its rearward end, and the sleeve may also have a hand opening as shown.

The bag 50 is placed on the interior of the sleeve 52 and the outer or forward edge 56 of the sleeve 52 is used for folding over the outer edge of the disposable bag that forms the bag mouth and is indicated at 57 in FIG. 2, so that the bag mouth folds around the edge portion 56 of the sleeve 52 and is held open.

Then, the sling 51 with the bag 50 in place, is placed into the outer support basket 35 with the rear portion under wall 39 of support basket 35. The tongue 53 is made so that it is long enough so that it folds up and will bear against the upright wall 37A as shown in FIGS. 1 and 5 and will provide a forward force or load because of the nature of the plastic used, which can be a fairly rigid polyethylene. The sleeve 52 will rest in the support basket and tends to urge the edge 56 of sleeve 52 against the gasket 25 to hold the bag initially in position.

The sleeve 52 fits inside the support basket side walls 36, and extends sufficiently far rearwardly so that it is held in the support basket. The sleeve 52 and tongue 53 can be formed so they widen out to one side in rearward direction from edge 56 to come close to both of the side walls 36. The edge 56 of the course is shaped to mate with gasket 25.

The opening or port 28 forms an air outlet port from the disposable bag 50 when the bag 50 is properly positioned against the gasket 25. An air discharge or outlet chute 60 is connected to the front side of port or opening 28, and curves forwardly and down as shown and open into a laterally extending plenum chamber 61, that has a bottom opening indicated generally at 62 through which the outlet air will flow. The air discharge chute has about the same or a slightly easier cross sectional area as port or opening 28. The duct 60 and the plenum chamber 61 can be molded of suitable plastic to form smooth contours so that air coming out from the bag will be carried by the conduit 60 and out through the outlet opening 62 immediately ahead of the mower housing 12, and between the front wheels 13, so that any material carried by the return air will be discharged out of the way of the operator holding the handle 17, and will be recycled again by the action of the mower blade 15.

In operation, once a disposable bag 50 has been put into place as shown in FIG. 1, and the edge of the mouth of the bag aligns with and abuts against the seal 25, the mower can be started, causing a flow of air from the blade 15, along with grass clippings and the like, to be discharged out through the discharge chute 20, and assuming that the baffle door 30 is open, through the port 22 into the interior of the disposable bag 50. The disposable bag 50 is inflated at this stage, and billows up generally as shown in dotted lines in FIG. 1, and this provides a force to move sleeve 52 against the seal 25 to provide for an adequate air seal. The air from the mower will circulate generally as shown by the arrows 63 in FIG. 2, toward the lower part of the bag 50. The cut material is urged toward the rear and against the bottom walls 40 of the support basket 35 and the bag supported therein. The air and clippings hit the rear of the bag 50 and air flow becomes turbulent and changes directions and most of the grass clippings and debris will be left in the disposable bag because of their heavier weight and an air pressure drop. The air has to change direction before it can go out the outlet port 28. The flow outwardly, which is indicated by the arrow 64, then goes through the port 28, chute 60, and into the plenum chamber 61 where any debris that is carried in the air, or pollen or dust or the like, will be discharged out ahead of the lawnmower housing 12 and recycled by blade 15.

The grass clippings are driven toward the rear end of the disposable bag 50 and thus the bag is packed from the bottom first, and can be filled adequately. As long as the air can flow around the rear edge of the baffle door 30 from the inlet port 22 to the outlet port 28, the operation of the present bagger attachment will be satisfactory.

The bag thus can be filled, and when filled, the operator can easily remove the bag by unlatching the basket door assembly 37 so that it moves generally to its dotted line position as shown in FIG. 1, and as shown partially open in FIG. 5. Then the handhold 54 from the tongue 53 can be gripped and the sling 51, including the sleeve 52 is pulled out, along with the bag. The disposable bag 50 will be removed easily without tending to lose the clippings that are in the bag. Once the sling 51 is outside of the basket 35, then the disposable bag is closed with a wire tie and removed from the sling, and a new bag is installed on the sling 51 by placing the mouth adjacent the edge 56 of the sleeve 52 and folding it over the end of the sleeve so that it will seal against the gasket 25 as previously explained. Closing the door 37 then again provides a force that tends to urge the edge of the bag 50 up against the sleeve 25.

Because the air pressures involved are not substantial, the seal 25 can be very soft and only a small amount of force will provide an adequate air seal.

Exhausting the debris to the front of the mower allows the mower to run over any dust or airborne grass clippings, or pollen and recirculate them through the grass catcher.

The air return chute 60 of the present invention has a large cross sectional area which is designed to be the same size throughout, with no constriction, and with smooth contours so that there is no tendency to plug. The air pressure in the grass catcher, including the disposable bag 50, is relatively low so that the air pressure drop in the bag 50 permits the large debris to be deposited easily and packed in the disposable bag. Because the discharge chute 60 has at least as large a cross sectional area (or larger) as the opening 28 back pressure resistance to the flow of air and grass clippings is greatly reduced which increases efficiency and tends to make plugging less likely. The present device easily installs on existing rear discharge mowers merely by using the base housing to provide a port for the rear discharge opening and a discharge port, and a low cost molded plastic front discharge chute and plenum chamber can be used without adding large discharge holes in the housing of the mower.

Although the present invention has been described with reference to preferred embodiments, workers skilled in the art will recognize that changes may be made in form and detail without departing from the spirit and scope of the invention.

What is claimed is:

1. For use in combination with a rotary mower having a mower blade operable to cut grass and discharge it through a rearwardly facing discharge chute as it moves over ground, said mower having a mower housing for supporting said discharge chute and a rearwardly extending handle, the improvement comprising:
    a bagger base housing mounted on said mower housing adjacent the rear portions of the mower housing;
    bag support means mounted on said mower at the rear of the bagger base housing for retaining a disposable, flexible bag adjacent the base housing and in communication with the base housing, said base housing having a first opening therein aligning with the discharge chute of a mower and having a second opening therein; and
    a second chute connected to said second opening in said base housing, said second chute leading forwardly from the base housing and having an outlet opening, positioned immediately ahead of the mower housing and facing in direction toward the ground whereby air and material carried into a bag on the bag support means will be forced to turn so the air flows out the second opening in the base housing so the air and any material carried thereby out of such bag will be discharged downwardly immediately ahead of the mower housing for recycling.

2. The apparatus as specified in claim 1 wherein the mower has a handle member at the rear portions thereof, and a bag support basket supported on said handle member, said support basket comprising a portion of the bag support means.

3. The apparatus as specified in claim 2 wherein said support basket is removably attached to the handle member of the mower.

4. The apparatus as specified in claim 1 wherein said bag support means for retaining a disposable flexible bag comprises a sling member having a sleeve defining an opening of size to receive the mouth of a portion of a disposable bag to be used and to permit the disposable bag to be wrapped around the edge of said sleeve, and means for retaining said sling member with the sleeve in position surrounding both of the openings in the base housing.

5. The apparatus as specified in claim 1 and gasket means surrounding both of the openings of said base housing and adapted to engage a bag portion surrounding an opening to a disposable bag held on said bag support means 6. The apparatus as specified in claim 4 wherein said sling member has the sleeve adjacent one end thereof, and a tongue member of that extends outwardly from the sleeve and is joined thereto, said tongue member being adjacent to lower portions of the sleeve and extending for a length so that the combined length from the edge of the sleeve supporting a disposable bag to the outer end of the tongue member is greater than the length of the support basket from its front to its rear so that the tongue member tends to urge the edge of the sleeve supporting the bag toward the base housing when the sling member is placed in the support basket.

7. The apparatus as specified in claim 6 wherein the support basket has a rear wall spaced rearwardly from the mower housing, and said rear wall forming a door that opens to permit a disposable bag supported therein to be removed rearwardly.

8. The apparatus as specified in claim 1 wherein said second chute comprises a plenum chamber extending laterally across the width of the mower housing ahead of the mower housing.

9. The apparatus as specified in claim 1 wherein said first opening is positioned below said second opening, whereby air and grass clippings which are discharged through the discharge chute through the first opening are propelled into a disposable bag held adjacent the base housing along the bottom thereof, and air carried through said discharge chute is permitted to move out of a disposable bag supported adjacent the base housing through the second opening and through said second chute.

10. The apparatus as specified in claim 9 and a baffle door positioned adjacent to the first opening, said baffle door being movable from a position wherein it uncovers said first opening, to a position to where it closes said first opening.

11. The apparatus as specified in claim 1 wherein said base housing is elongated in a vertical direction and relatively narrow in a horizontal direction and is positioned within the periphery of the mower housing.

12. The apparatus as specified in claim 3 wherein said handle member for said mower comprises a "U" shaped handle having side members that are laterally spaced apart, and said support basket comprises a relatively rigid plastic member having spaced apart side walls that are supported on and extend downwardly from said side members of said handle, a bottom wall joining said side walls, and a rear door forming a rear wall extending between said side walls and movable from a position wherein the rear wall extends generally uprightly, to a position wherein the rear wall is moved to provide a rear opening in said support basket.

13. An attachment for a lawnmover having a mower blade that provides for a flow of air and grass clippings through a discharge chute generally rearwardly of the mower, said attachment including:
    a base housing plate mounted generally uprightly for mounting adjacent the rear portions of a mower, said base housing plate having an opening therein aligning with a discharge chute of a mower on which the base housing plate is mounted to permit rearward discharge of air and grass clippings;
    a second opening in said base housing plate spaced upwardly from said first opening;
    an outlet chute connected to said second opening and defining a passageway that extends forwardly of a mower housing of a mower on which the base housing plate is mounted, said outlet chute having an outlet opening at the forward end thereof positioned ahead of the path of travel of a mower on which the base housing plate is mounted and the outlet opening facing generally in direction to cause air discharging from the outlet opening to be moved toward ground over which the mower travels; and means for supporting a disposable bag having an opening to the bag with the opening to the bag circumscribing the first and second openings to receive air and grass clippings from the first opening and permit air to discharge from the second opening after the air has changed direction within a disposable bag held in the means for supporting a bag.

14. The apparatus as specified in claim 13 wherein said means for supporting a bag comprises a support basket, said support basket having means for attaching it to a handle on a mower on which the base housing plate is mounted and providing a support for portions of a bag extending rearwardly from the means for supporting a disposable bag, whereby when a supported disposable bag on inflates it is caused to react against the walls of the means for supporting and be urged toward the base housing plate.

15. The apparatus as specified in claim 13 and means defining a frame generally corresponding to the periphery of the base housing plate, said frame having an open center, and a disposable bag being adapted to be mounted through the center of the frame, with edges of a disposable bag adjacent a bag opening folded around the frame to provide an open mouth supported by the frame which circumscribes the first and second openings.

16. The apparatus as specified in claim 15 wherein said frame comprises a generally sleeve shaped member having a length in fore and aft direction, and a tongue member molded to the lower portions of the frame and extending rearwardly therefrom, said tongue member being formed of a resilient flexible material, and having a length so that it engages a rear wall of said support basket to provide a force urging the mouth of a bag supported on the frame forwardly toward the base housing plate.

17. The apparatus as specified in claim 13 and a baffle door associated with said first opening, said baffle door being movable from a position wherein it closes the first opening to a position wherein the first opening is permitted to discharge air and grass clippings into a bag supported on the bag support basket, and clip means to hold said baffle door in open position.

18. The apparatus as specified in claim 17 and spring means urging said baffle door toward its closed position.

* * * * *